United States Patent [19]

Shimada

[11] Patent Number: 5,757,747
[45] Date of Patent: May 26, 1998

[54] TRACKING SERVO SIGNAL PROCESSING CIRCUIT AND READ APPARATUS USING THE SAME

[75] Inventor: Hiroshi Shimada, Tokyo, Japan

[73] Assignee: Kabushiki Kaisha Toshiba, Kawasaki, Japan

[21] Appl. No.: 783,013

[22] Filed: Jan. 14, 1997

[30] Foreign Application Priority Data

Jan. 16, 1996 [JP] Japan ................... 8-005059

[51] Int. Cl.[6] ........................................ G11B 7/085
[52] U.S. Cl. .................. 369/44.28; 369/44.29; 369/44.25
[58] Field of Search .................. 369/44.28, 44.29, 369/44.35, 44.27, 44.34, 44.25, 54, 124

[56] References Cited

U.S. PATENT DOCUMENTS

| | | |
|---|---|---|
| 4,835,754 | 5/1989 | Yamamoto et al. ............ 369/44.28 |
| 5,216,560 | 6/1993 | Noguchi ............ 369/44.28 |
| 5,408,454 | 4/1995 | Hasegawa ............ 369/44.25 |
| 5,548,569 | 8/1996 | Shimizuame et al. ............ 369/44.28 |
| 5,621,709 | 4/1997 | Takahashi ............ 369/44.32 |

*Primary Examiner*—Thang V. Tran
*Attorney, Agent, or Firm*—Oblon, Spivak, McClelland, Maier & Neustadt, P.C.

[57] ABSTRACT

A tracking error signal is converted into digital data by an A/D converter. A compensation circuit performs gain and phase compensation operations in accordance with the frequency of the digital data. A kick signal generation circuit turns off a switch in access processing and outputs a kick signal. A comparator detects the magnitude relationship between output data from a filter and a reference level. During data read processing, a system controller sets the reference level at R1, detects the disturbance of the rotation frequency of a disk, and appropriately sets the compensation characteristic of the compensation circuit. During access processing, the system controller sets the reference level at R2, detects the moving amount of a pickup, and if the moving amount is large, sets the value of the kick signal to be small.

3 Claims, 4 Drawing Sheets

TRACKING SERVO SIGNAL PROCESSING CIRCUIT AND READ APPARATUS USING THE SAME

BACKGROUND OF THE INVENTION

The present invention relates to a tracking servo circuit of a read apparatus for an optical disk such as a compact disk (CD).

FIG. 1 is a block diagram showing the main part of a read apparatus for an optical disk such as a compact disk.

An optical pickup 2 irradiates a laser beam on the surface of a disk 1, detects light reflected by the disk 1 to read data stored in the disk 1, and outputs the data as an electrical signal. The output signal from the optical pickup 2 is amplified by a head amplifier 3 into a tracking error signal.

This tracking error signal is sent to a compensation circuit 4. The compensation circuit 4 performs control of an open-loop gain necessary for tracking servo, and gain compensation and phase compensation for ensuring a phase margin.

An output signal from the compensation circuit 4 is sent to a power driver 5 and power-amplified by the power driver 5. An output signal from the power driver 5 is supplied to the tracking actuator of the pickup 2.

This feedback loop is formed to properly trace the pits of the disk 1 with the laser beam irradiated from the pickup 2.

When the laser beam is to be moved from the currently traced track to another track (perform access processing), the feedback loop (servo loop) is temporarily turned off by a switch 6. A kick signal is generated by a kick signal generation circuit 7 and forcibly supplied to the tracking actuator of the pickup 2.

With this operation, the laser beam moves from the currently traced track to another track. Thereafter, the feedback loop (servo loop) is turned on again by the switch 6.

Basically, tracking servo can be realized by the read apparatus with the above arrangement. In practice, a predetermined circuit is often added to the read apparatus with the above arrangement to improve the read performance or access performance.

FIG. 2 is a block diagram showing the tracking servo circuit of a read apparatus having a function of preventing a degradation in read performance caused by the eccentricity of a disk.

When the disk 1 to be read is eccentric, the center of the disk 1 does not completely match that of a spindle motor 8. For this reason, the disturbance of the rotation frequency of the disk 1 is applied to tracking servo.

When the disk 1 is largely eccentric, a large disturbance is applied to servo tracking accordingly, resulting in a degradation in read performance.

To solve this problem, a frequency component (close to the rotation frequency of the disk 1: 3 to 8 Hz for a CD) of an output signal from the compensation circuit 4 is extracted by a low-pass filter 9. The frequency component is compared with the level of a detection level source 11a by a comparator 10 to detect whether the low-frequency component of the compensation circuit 4 has a value larger than a predetermined value.

With this arrangement, it is detected that the actuator driving voltage value in the low-frequency range becomes larger than the predetermined value. In this case, the gain of the compensation circuit 4 in the low-frequency range is increased to suppress the residual error, thereby ensuring the read performance.

FIG. 3 is a circuit diagram showing an example of the compensation circuit which switches the gain in the low-frequency range. Referring to FIG. 3, reference symbols R1 to R5 denote resistors; and C1 and C2, capacitors. Reference numeral 17 denotes an operational amplifier; and 18, a switch. The operation of the switch 18 is controlled by an output signal φ from a comparator (comparator 10 in FIG. 2).

FIG. 4 is a block diagram showing the tracking servo circuit of a read apparatus having a function of preventing an excessive increase in moving amount of the pickup during the access operation.

During the access operation, if the pickup 2 moves close to the limitation of the movable range of the tracking actuator, the signal detection sensitivity of the pickup 2 or the driving sensitivity of the actuator decreases. Therefore, when the servo loop is turned on again, the servo loop performance may be degraded.

To solve this problem, an output signal from the low-pass filter 9 is compared with the level of a detection level source 11b by the comparator 10 to detect that the value of the kick signal to be applied to the tracking actuator during the access operation is larger than a predetermined value.

With this arrangement, the output signal value from the kick signal generation circuit 7 is decreased to prevent an excessive increase in moving amount of the pickup during the access operation. In this case, the pickup is moved to a predetermined track by using another means, thereby completing the access operation.

As described above, to improve the read performance or access performance of the tracking servo circuit of the conventional read apparatus, a predetermined circuit must be added to the tracking servo circuit shown in FIG. 1 to obtain an arrangement as shown in FIG. 2 or 4.

However, when the circuit for improving the read performance or access performance is added, the manufacturing cost increases.

In addition, to simultaneously improve both the read performance and the access performance, independent comparators must be used, resulting in a further increase in circuit scale.

In many cases, actually, the read apparatus as shown in FIG. 1 is mass-produced at the expense of the improvements in each performance.

Instead of the arrangement shown in FIG. 2, the compensation circuit may have a characteristic in consideration of the maximum possible eccentricity of the disk. In this case, however, a side effect tends to occur such that the low-frequency gain compensation may become overcompensation for a disk free from an eccentricity, and the read performance for a disk with scratches is degraded.

That is, an optimum compensation characteristic according to the amount of eccentricity of a disk to be read can hardly be set.

BRIEF SUMMARY OF THE INVENTION

The present invention has been made to solve the above problems, and has as its object to achieve an improvement in read performance and an improvement in access performance at a low cost without increasing the circuit scale.

It is another object of the present invention to provide a signal processing circuit which can always obtain an optimum compensation characteristic according to the eccentricity of a disk, and a read apparatus using the circuit.

In order to achieve the above objects, according to the present invention, there is provided a signal processing circuit comprising a compensation circuit which receives input data obtained by digitizing a tracking error signal, performs gain and phase compensation operations in accordance with a frequency of the input data, and has an arrangement for enabling to change a compensation characteristic, a kick signal generation circuit which shields input of the input data in track access processing, supplies, to the compensation circuit, a kick signal for moving a pickup to a predetermined track, and has an arrangement for enabling to change a value of the kick signal, a filter for extracting a low-frequency component from output data from the compensation circuit, a comparator which compares output data from the filter with a reference level to detect a magnitude relationship therebetween, and a reference level register which generates the reference level and has an arrangement for enabling to change a value of the reference level, wherein, in reading the input data, the reference level is set at a first value, a disturbance of a rotation frequency of a disk is detected, and the compensation characteristic of the compensation circuit is set in accordance with a detection result, and in accessing the track, the reference level is set at a second value, a moving amount of the pickup is detected, and the value of the kick signal is adjusted in accordance with a detection result.

According to the present invention, there is also provided a read apparatus comprising pickup means for irradiating a laser beam on a disk, detecting reflected light, and generating an electrical signal corresponding to data recorded in the disk, tracking error signal generation means for generating a tracking error signal having tracking servo error information on the basis of the electrical signal, analog/digital conversion means for quantizing and sampling the tracking error signal and converting the tracking error signal into digital data, tracking servo compensation means, having an arrangement for enabling to change a compensation characteristic, for performing gain and phase compensation operations for the digital data in accordance with a frequency of the digital data, kick signal generation means, having an arrangement for enabling to change a value of a kick signal, for shielding input of the input data in track access processing, and supplying, to the tracking servo compensation means, the kick signal for moving a pickup to a predetermined track, filter means for extracting a low-frequency component from output data from the tracking servo compensation means, comparison means for comparing output data from the filter means with a reference level to detect a magnitude relationship therebetween, reference level generation means, having an arrangement for enabling to change a value of the reference level, for generating the reference level, and control means for, in reading the input data, setting the reference level at a first value, detecting a disturbance of a rotation frequency of the disk, and setting the compensation characteristic of the tracking servo compensation means in accordance with a detection result, and in accessing the track, setting the reference level at a second value, detecting a moving amount of the pickup, and adjusting the value of the kick signal in accordance with a detection result.

The read apparatus of the present invention further comprises digital/analog conversion means for converting the data output from the tracking servo compensation means into an analog signal, and drive means for driving the pickup on the basis of the analog signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

A signal processing circuit of the present invention and a read apparatus using this circuit will be described below in detail with reference to the accompanying drawings.

Figure 1:
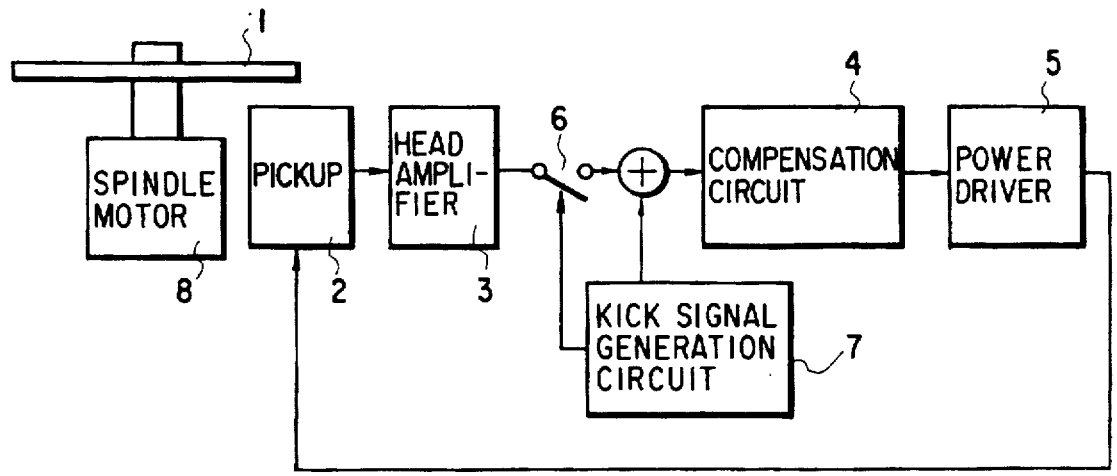
FIG. 1 is a block diagram showing a tracking servo circuit in a conventional read apparatus.
Figure 2:
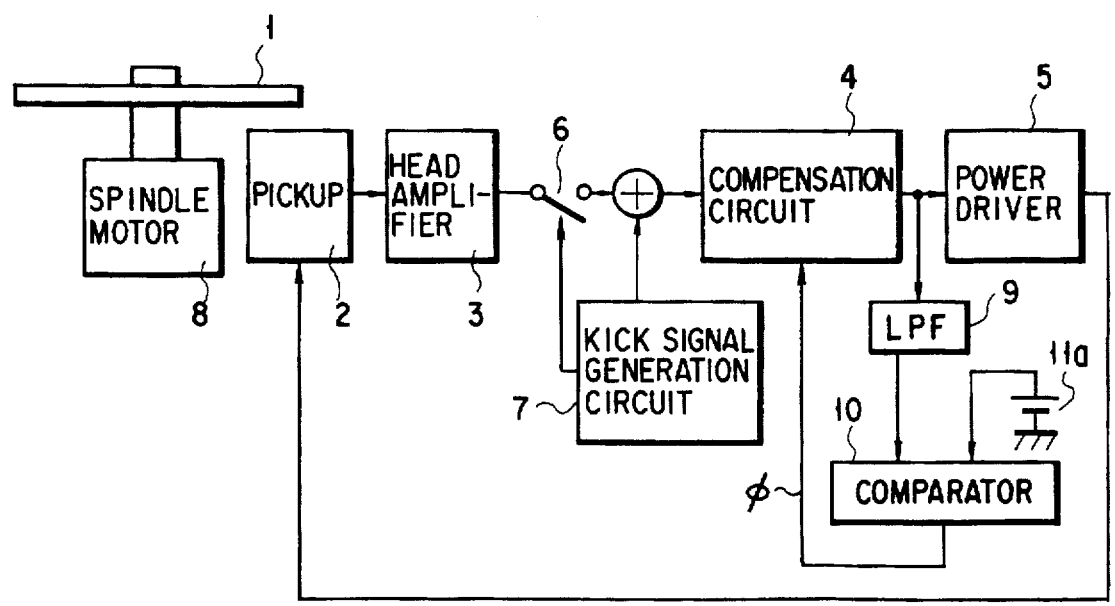
FIG. 2 is a block diagram showing a circuit obtained by adding a means for improving the read performance to the circuit shown in FIG. 1.
Figure 3:
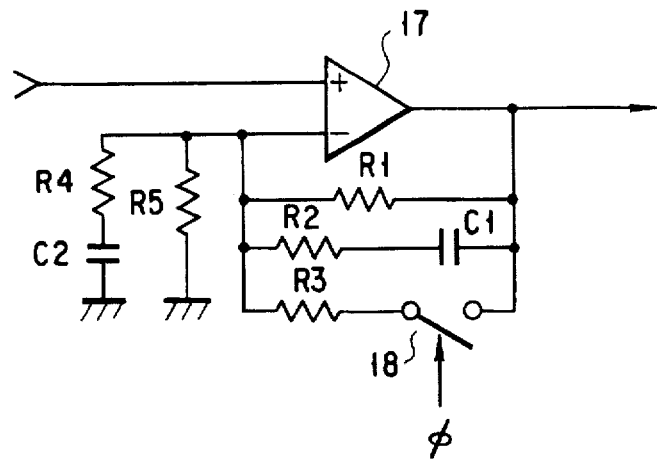
FIG. 3 is a circuit diagram showing an example of a compensation circuit shown in FIG. 2.
Figure 4:
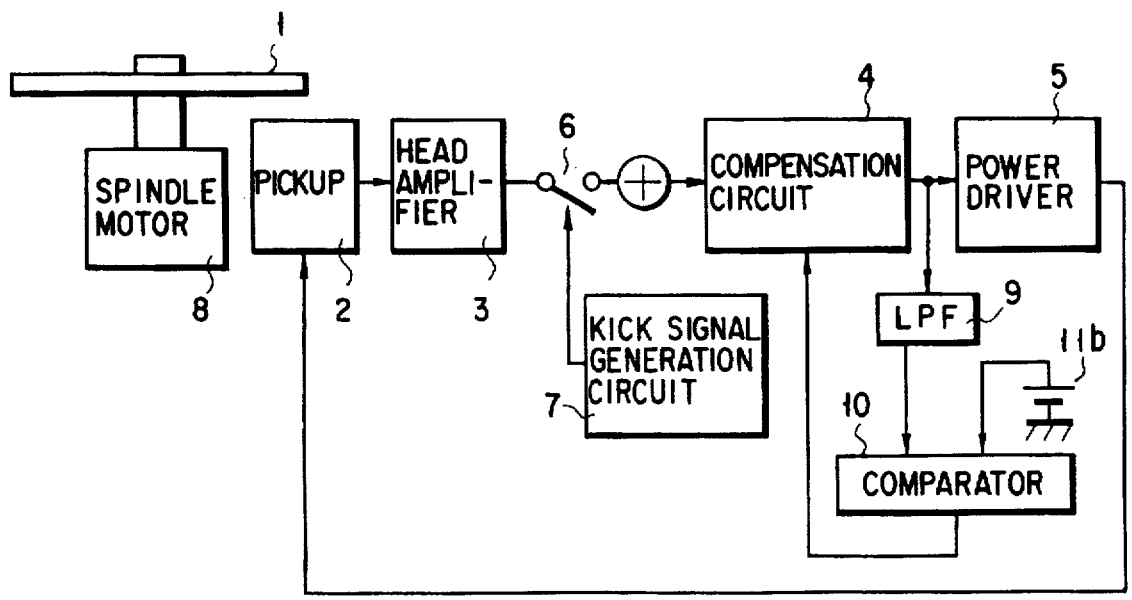
FIG. 4 is a block diagram showing a circuit obtained by adding a means for improving the access performance to the circuit shown in FIG. 1.
Figure 5:
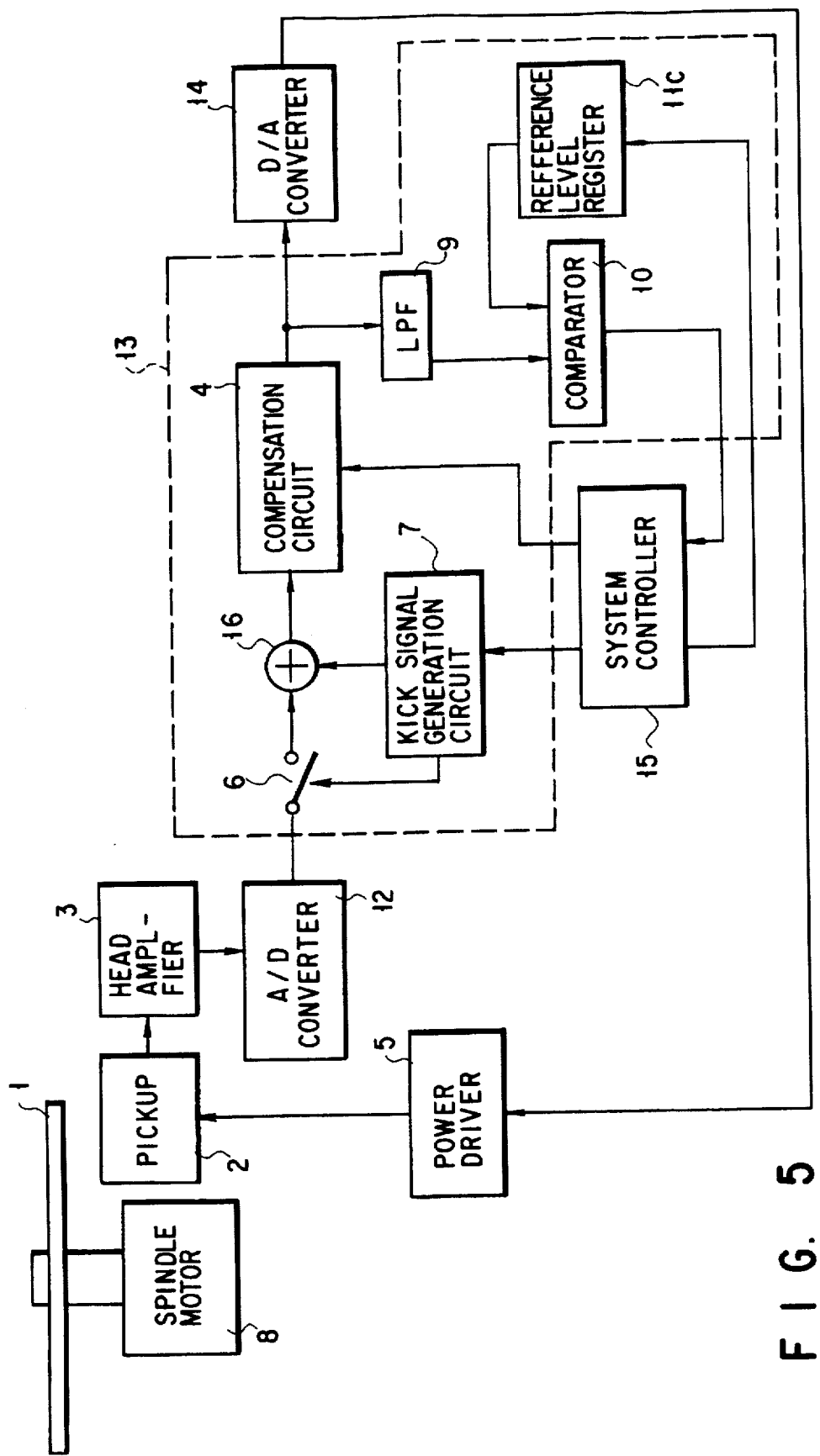
FIG. 5 is a block diagram showing a tracking servo circuit in a read apparatus according to the embodiment of the present invention.
Figure 6:
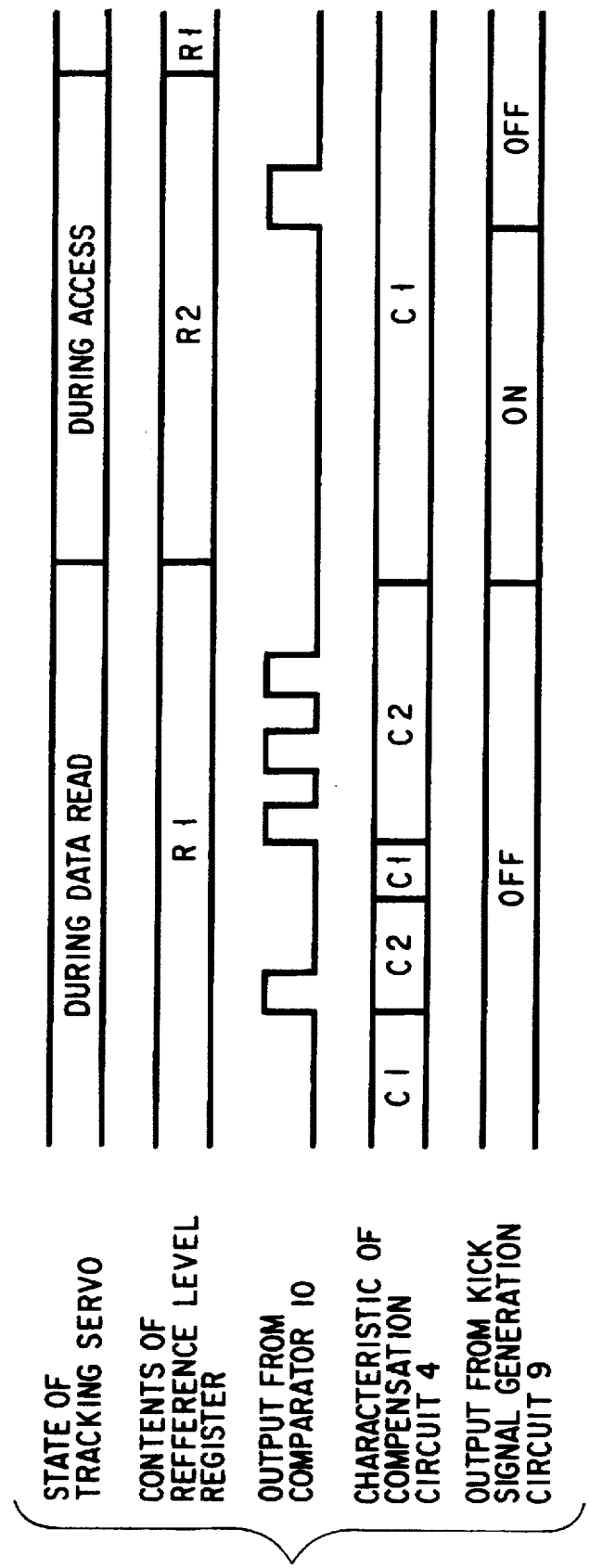
FIG. 6 is a timing chart showing the operation of the circuit shown in FIG. 5.

FIG. 5 is a block diagram showing the main part of the read apparatus according to the embodiment of the present invention. FIG. 6 is a timing chart showing the operation of the read apparatus shown in FIG. 5.

This read apparatus is characterized in that a tracking error signal is converted into digital data, compensation processing and tracking movement processing are realized by digital signal processing, and processing for an improvement in performance is also realized by digital signal processing.

When a series of processing operations are performed as digital signal processing, a plurality of processing operations can be performed by a single digital signal processor (to be referred to as a DSP hereinafter), and a means for improving the performance can be achieved without adding any circuit.

Additionally, by changing the reference level of a comparator in the DSP as needed, the output result from the comparator is used for a plurality of purposes (improvements in each performance).

The arrangement of the read apparatus according to this embodiment will be described below.

A disk (e.g., a CD or a CD-ROM) 1 is rotatably driven by a spindle motor 8. An optical pickup 2 irradiates a laser beam on the surface of the disk 1, detects light reflected by the disk 1 to read data stored in the disk 1, and outputs the data as an electrical signal.

The output signal from the optical pickup 2 is amplified by a head amplifier 3 into a tracking error signal having tracking servo error information.

This tracking error signal is input to an analog/digital converter (to be referred to as an A/D converter hereinafter)

12. The A/D converter 12 quantizes and samples the tracking error signal, and converts the tracking error signal into digital data. The digital data is subjected to predetermined processing by a DSP 13.

A tracking servo compensation circuit 4 performs control of an open-loop gain necessary for tracking servo, and gain compensation and phase compensation for ensuring a phase margin.

The tracking servo compensation circuit 4 is constituted by a digital filter, and its compensation characteristics are defined by the coefficient of the digital filter. The coefficient of the digital filter can be set by a system controller 15. More specifically, by changing the coefficient of the digital filter by the system controller 15, the compensation characteristic of the compensation circuit 4 can be set to be optimum.

When the laser beam is to be moved from the currently traced track to another track (perform access processing), a kick signal generation circuit 7 temporarily turns off the feedback loop with a switch 6.

The kick signal generation circuit 7 generates a kick signal (tracking movement signal). The kick signal is input to the compensation circuit 4.

The magnitude (value) of the kick signal is defined by the coefficient of the kick signal generation circuit 7. The coefficient of the kick signal generation circuit 7 can be set by the system controller 15. More specifically, by changing the coefficient of the kick signal generation circuit 7 by the system controller 15, the magnitude of the kick signal can be adjusted.

With this operation, the laser beam properly moves from the currently traced track to another track. Thereafter, the feedback loop is formed by the switch 6 again.

A low-pass filter 9 extracts only a low-frequency component on the basis of the data output from the tracking servo compensation circuit 4. A comparator 10 compares data output from the low-pass filter 9 with the reference level, thereby detecting the magnitude relationship therebetween.

The reference level is generated by a reference level register 11c. The value of the reference level of the reference level register 11c can be rewritten by the system controller 15. More specifically, by changing the reference level by the system controller 15, the output result from the comparator 10 can be used for a plurality of purposes (improvements in each performance).

The system controller 15 always monitors the output data from the comparator 10 and changes the coefficient of the compensation circuit 4 and the coefficient of the kick generation signal in accordance with the comparison result, thereby achieving appropriate read performance and access performance.

More specifically, in normal data read processing, the system controller 15 sets the reference level at a predetermined value, detects the disturbance of the rotation frequency of the disk 1, and sets the compensation characteristic of the tracking servo compensation circuit 4 in accordance with the detection result. In track access processing (movement processing), the system controller 15 sets the reference level at a predetermined value, detects the moving amount of the pickup, and adjusts the value of the kick signal in accordance with the detection result.

The data output from the compensation circuit 4 is input to a D/A converter 14 and converted into analog data. This analog data is sent to a power driver 5 and power-amplified to drive the tracking actuator of the pickup 2.

This feedback loop is formed to properly trace the pits of the disk 1 with the laser beam irradiated from the pickup 2.

The operation of the above-described read apparatus (operation of the system controller) will be described below.

During normal data read processing (in the tracking servo OFF state), data R1 is set in the reference level register 11c, and the characteristic of the compensation circuit 4 is set at C1. The characteristic C1 is set such that stable servo control is performed when the eccentricity of the disk 1 is smaller than X.

More specifically, the output from the comparator 10 changes when the eccentricity of the disk 1 exceeds X. For example, the value of the data R1 is set such that when the eccentricity of the disk 1 is smaller than X, a signal of low level is output from the comparator 10, and when the eccentricity of the disk 1 is equal to or larger than X, a signal of high level is output from the comparator 10.

In this case, when a signal of low level is output from the comparator 10, the system controller 15 holds the characteristic C1 of the compensation circuit 4. When the signal output from the comparator 10 goes high, the characteristic of the compensation circuit 4 is switched to C2.

The characteristic C2 is set such that stable servo control is performed even when the eccentricity of the disk 1 is equal to or larger than X.

When the timing of switching the characteristics C1 and C2 is determined directly on the basis of the output from the comparator 10, the characteristic of the compensation circuit 4 frequently changes. To prevent this, a hysteresis by a delay timer may be set.

For example, the hysteresis is set such that when the output from the comparator 10 goes to high level, the characteristic of the compensation circuit 4 is immediately changed to C2, and when the output from the comparator 10 goes to low level, the characteristic of the compensation circuit 4 is changed to C1 not immediately but after the low-level state has continued for a predetermined period.

In track access processing (movement processing), data R2 is set in the reference level register 11c. More specifically, the output from the comparator 10 is set to change when the moving amount of the tracking actuator enters a range for degrading the tracking performance of the pickup 2.

Assume that the tracking performance of the pickup 2 is degraded when the moving amount is equal to or larger than Y. In this case, the value of the data R2 is set such that the output from the comparator 10 goes high when the moving amount is equal to or larger than Y.

The system controller 15 sets the data R2 in the reference level register 11c at the start of the access operation, and monitors the output from the comparator 10.

When the output from the comparator 10 goes high, the value of the kick signal from the kick signal generation circuit 7 is decreased, or output of the kick signal is stopped at all, thereby preventing a further increase in moving amount.

In this case, another means is used to move the pickup 2 to a predetermined track.

As has been described above, according to the signal processing circuit of the present invention, and the read apparatus using the circuit, the following effects can be obtained.

Part of the tracking servo circuit is constituted by the DSP, and the tracking error signal is converted into digital data. With this arrangement, compensation processing, tracking movement processing, and processing for an improvement in performance are realized by digital signal processing.

More specifically, an optimum compensation characteristic can be maintained in accordance with the amount of eccentricity of the disk to improve the read performance. In addition, during tracking servo access processing, the operation is always performed within a range not to degrade the tracking characteristic of the pickup, so that the access performance can be improved.

Furthermore, the circuit scale of the tracking servo circuit does not increase even upon various improvements in performance.

As described above, since various processing operations of the tracking servo circuit are performed as digital signal processing, various processing operations can be performed by a single DSP, so that the means for improving the performance can be achieved without increasing the circuit scale.

The present invention can apply to a DVD (Digital Versatile Disc) system or CD-ROM system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A signal processing circuit comprising:

a compensation circuit which receives input data obtained by digitizing a tracking error signal, performs gain and phase compensation operations in accordance with a frequency of the input data, and has an arrangement for enabling to change a compensation characteristic;

a kick signal generation circuit which shields input of the input data in track access processing, supplies, to said compensation circuit, a kick signal for moving a pickup to a predetermined track, and has an arrangement for enabling to change a value of the kick signal;

a filter for extracting a low-frequency component from output data from said compensation circuit;

a comparator which compares output data from said filter with a reference level to detect a magnitude relationship therebetween; and a reference level register which generates the reference level and has an arrangement for enabling to change a value of the reference level, wherein, in reading the input data, the reference level is set at a first value, a disturbance of a rotation frequency of a disk is detected, and the compensation characteristic of said compensation circuit is set in accordance with a detection result, and in accessing said track, the reference level is set at a second value, a moving amount of said pickup is detected, and the value of the kick signal is adjusted in accordance with a detection result.

2. A read apparatus comprising:

pickup means for irradiating a laser beam on a disk, detecting light reflected by said disk, and generating an electrical signal corresponding to data recorded in said disk;

tracking error signal generation means for generating a tracking error signal having tracking servo error information on the basis of the electrical signal;

analog/digital conversion means for quantizing and sampling the tracking error signal and converting the tracking error signal into digital data;

tracking servo compensation means, having an arrangement for enabling to change a compensation characteristic, for performing gain and phase compensation operations in accordance with a frequency of the digital data;

kick signal generation means, having an arrangement for enabling to change a value of a kick signal, for shielding input of the input data in track access processing, and supplying, to said tracking servo compensation means, the kick signal for moving a pickup to a predetermined track;

filter means for extracting only a low-frequency component from output data from said tracking servo compensation means;

comparison means for comparing output data from said filter means with a reference level to detect a magnitude relationship therebetween;

reference level generation means, having an arrangement for enabling to change a value of the reference level, for generating the reference level; and control means for, in reading the input data, setting the reference level at a first value, detecting a disturbance of a rotation frequency of said disk, and setting the compensation characteristic of said tracking servo compensation means in accordance with a detection result, and in accessing said track, setting the reference level at a second value, detecting a moving amount of said pickup, and adjusting the value of the kick signal in accordance with a detection result.

3. An apparatus according to claim 2, further comprising:

digital/analog conversion means for converting the data output from said tracking servo compensation means into an analog signal; and drive means for driving said pickup on the basis of the analog signal.

* * * * *